United States Patent [19]

Van Praag

[11] Patent Number: 5,283,737
[45] Date of Patent: Feb. 1, 1994

[54] MECHANISM FOR GENERATING LINGUISTIC EXPRESSIONS BASED ON SYNONYMS AND RULES DERIVED FROM EXAMPLES

[75] Inventor: John Van Praag, Arlington, Mass.

[73] Assignee: ProLab Software Inc., Arlington, Mass.

[21] Appl. No.: 586,251

[22] Filed: Sep. 21, 1990

[51] Int. Cl.⁵ .......................................... G06F 15/38
[52] U.S. Cl. ............................................ 364/419.14
[58] Field of Search .................... 364/419, 300, 513

[56] References Cited

U.S. PATENT DOCUMENTS 4,506,326  3/1985  Shaw et al. ........................ 364/300

Primary Examiner—Roy N. Envall, Jr.
Assistant Examiner—Khai Tran
Attorney, Agent, or Firm—Allegretti & Witcoff, Ltd.

[57] ABSTRACT

A computer tool that induces linguistic rules from particular examples and that can store and utilize these rules. A user of the tool provides examples from which the tool can induce rules, and provides feedback to guide the tool in formulating rules. The tool also can generate, store and utilize synonyms, and can learn to exclude objects from the induction process.

60 Claims, 3 Drawing Sheets

Microfiche Appendix Included
(3 Microfiche, 3 Pages)

MECHANISM FOR GENERATING LINGUISTIC EXPRESSIONS BASED ON SYNONYMS AND RULES DERIVED FROM EXAMPLES

BACKGROUND OF THE INVENTION

Computer-based systems are often controlled by formal languages that are complex and difficult to master. Examples of such languages include database languages such as Dbase and SQL (Structured Query Language), operating system languages such as MS-DOS, UNIX, and VMS, and the command languages of some spreadsheets and word processors.

End users of these systems often do not have the specialized training needed to use the formal languages associated with them. Consequently, substantial resources are often expended in the development of human-computer interfaces. A human-computer interface provides the user with access to the functions which the formal language controls, while shielding the user from the complexities of the formal language.

The creation of a human-computer interface may be a costly task involving a lengthy design process, often followed by extensive coding of software. There is therefore a benefit to be realized in providing the developers of human-computer interfaces with tools that allow them to rapidly create interfaces.

SUMMARY OF THE INVENTION

A tool that induces linguistic rules from particular examples, and that can store and utilize these rules, is disclosed herein. A user of the tool only needs to provide examples from which the tool can induce rules, and provide feedback to guide the tool in formulating rules appropriately. The tool can also generate, store, and utilize synonyms. By tracking a user's interaction with it, the tool can learn to exclude objects from the process of induction. Rules, synonyms, and objects are described below.

An application of the disclosed invention is to rapidly create human-computer interfaces, where the interfaces so derived are based on a collection of rules and synonyms generated with the disclosed invention. When using such an interface, the end user may use expressions in his or her own native language, or in a professional jargon or personal slang, to access the computer system, instead of having to use the underlying formal language(s).

An underlying formal language addressed by the disclosed invention could be a human language such as English or French expressed by a formal grammar or other symbolic representation and processed by a computer in the same sense that Fortran or SQL are processed. In this case the disclosed invention could be used to extend the underlying formal (human) language by adding new rules and synonyms or to generate a translation facility by adding rules and synonyms that map to the underlying formal (human) language from some other human language(s).

DESCRIPTION OF THE DRAWINGS

The invention will be more fully understood from the following detailed description, taken in conjunction with the accompanying drawings, in which.

DETAILED DESCRIPTION OF THE INVENTION

The language learning shell disclosed herein provides a mechanism that is able to generate, store and utilize rules and synonyms. A rule establishes a correspondence between a class of linguistic expressions having arbitrary structure, and a class of transactions in one or more formally described languages (possibly extended by previously created rules). A synonym establishes a correspondence between two arbitrary expressions.

For purposes of understanding the present invention, reference is made to an embodiment, the source code for which is attached hereto, which embodiment is a tool enabling the creation of human-computer interfaces to the SQL (Structured Query Language) database language. It will be readily apparent to one skilled in the art that the present invention will work with languages other than SQL, and need not be limited to the disclosed embodiment. In the course of the discussion below, certain formalisms, data structures, and subject matter will be referenced so as to make the exposition more concrete. It will be readily apparent to one skilled in the art that other formalisms, data structures, and subject matter could equally well serve to exemplify the mechanisms described herein.

The invention disclosed herein generates rules and synonyms from examples. An example, for the purposes of the present invention, is a pair of the form, X→Y. The arrow (→) is interpreted as "means" or "implies." The first member of the pair, X, will be referred to as the "left-member" of the pair, and the second member, Y, will be referred to as the "right-member."

A system that derives generalizations from examples is said to exhibit "example-based learning." Typical examples, involving textual inputs, are the following:

1) arrival time
→arr$_{13}$ time;
2) what is the arrival time of flight 222
→select arr_time from flights where flight 222; or
3) show cost 345
→what is the cost of flight 345.

Example (1) could establish an equivalence between "arrival time," an English phrase, and "arr_time," the name of a column in a database. This example could lead to the creation of a synonym.

Examples (2) and (3) could lead to the creation of rules. In example (2), for instance, the first member of the pair is an ordinary English expression, and the second member of the pair is a statement in the database language SQL, the literal meaning of which is: given a table called "flights" with columns "arr_time" and "flight," retrieve the contents of the "arr_column for all records where the "flight" column takes the value 222. In this example, the SQL statement is, in the context of querying a database, equivalent to, or implied by, the English expression. Example (3) establishes an equivalence between a terse English expression and a lengthier and clearer expression in English.

These three examples could be supplied in the course of a dialogue between a computer program and its environment, whether a human user, a file, another program, or a device of some kind. A dialogue can be defined as the sequence of steps necessary to obtain an input from the environment, react to the input, obtain another input, react, and so on, until an input is received indicating that the dialogue shall terminate.

Figure 1:
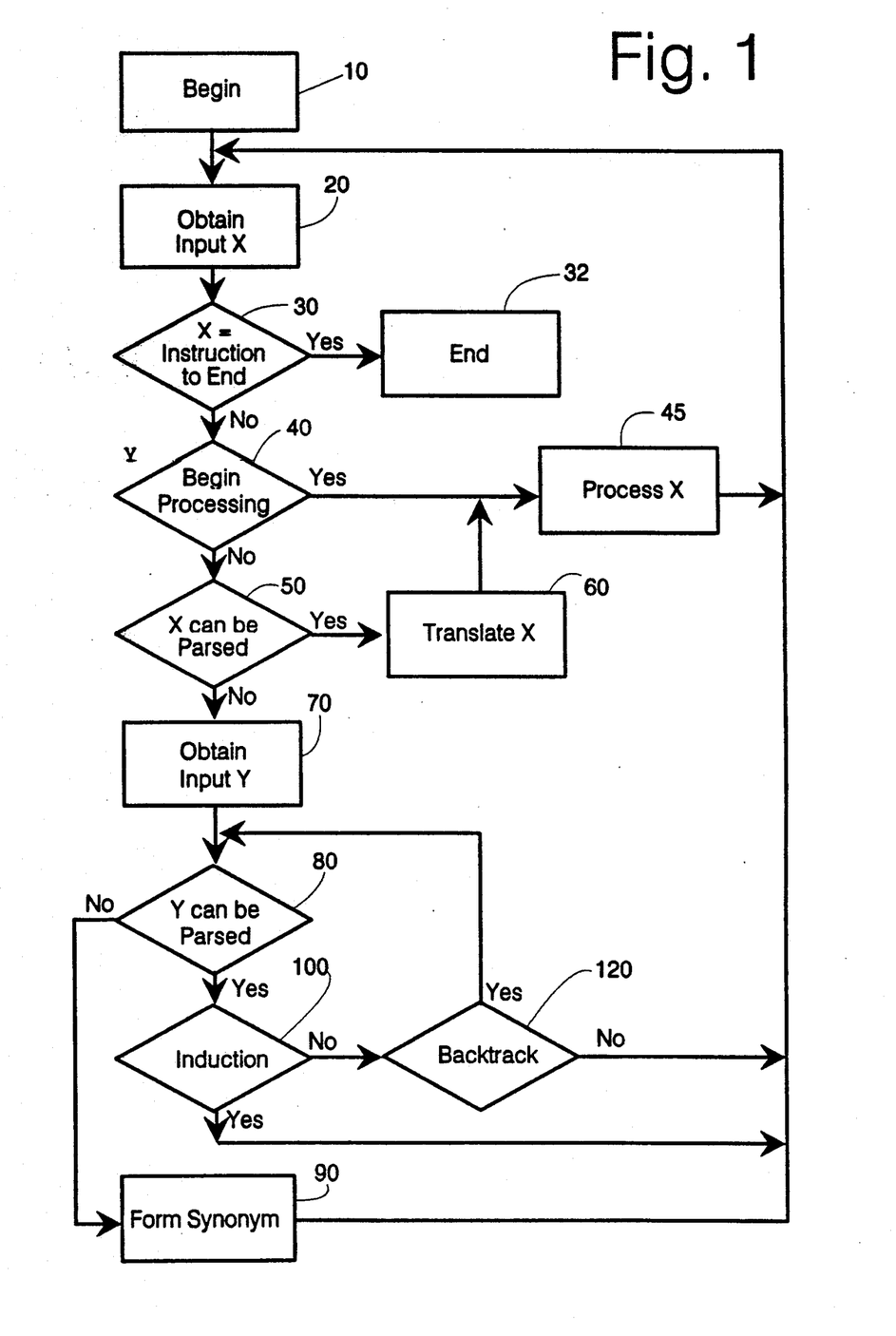
FIG. 1 is a flow diagram depicting the sequence of operations of a computer system operated in accordance with the present invention.

FIG. 1 is a flow diagram depicting the dialogue carried out by a computer system operated in accordance with the present invention. In the course of the actual operation of the sequence shown in FIG. 1, messages and displays may be presented to a user so as to keep the user informed and/or to elicit a response from the user.

With reference to FIG. 1, following a "Begin" step 10, an input X is obtained at step 20. The sequence of steps necessary to obtain an input at step 20 are shown in more detail in FIG. 2.

Figure 2:
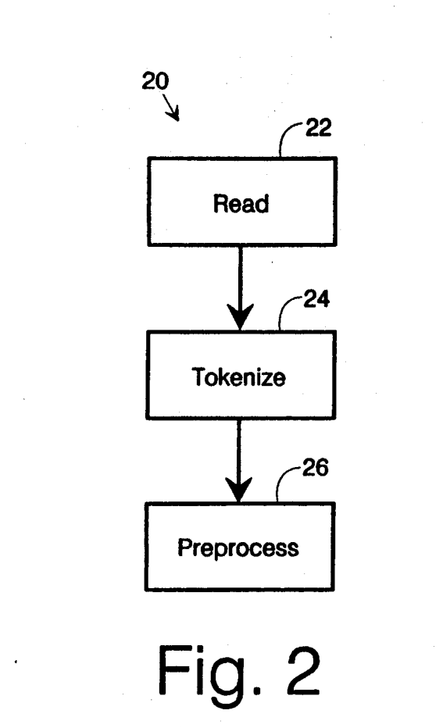
FIG. 2 is a flow diagram depicting the sequence of operations to obtain an input.

As shown in FIG. 2, obtaining an input involves three operations: reading the input, tokenizing it, and preprocessing it. During the read operation 22, the raw material of the input is acquired. For example, if the input is textual, reading the input may mean acquiring a string of characters. If the input is graphical, reading the input may mean acquiring an array of pixels. Similar comments apply to acoustic, video, and multimedia inputs.

After the input is read, it is segmented into the smallest meaningful units that are relevant for subsequent processing, during step 24. This step, known as tokenization, results in a collection of items, called "tokens." In the disclosed embodiment, for example, tokenization of text yields a list of tokens, where a token can be an individual punctuation or space character, or a sequence of alphabetic or numeric characters. In the course of tokenizing, irrelevant material, such as white space beginning or terminating an input, may be discarded.

The pairs shown in Examples (1), (2) and (3), above, with their members tokenized by the disclosed embodiment, would appear as follows:

(4) [$arrival$, $ $, $time$]
→[$arr$, $13 $, $time$];

(5) [$what$, $ $, $is$, $ $, $the$, $ $, $arrival$, $ $, $time$, $ $, $of$, $ $, $flight$, $ $, $222$]
→[$select$, $ $, $arr$, $_$, $time$, $ $, $from$, $ $, $flights$, $ $, $where$, $ $, $flight$, $ $, $=$, $ $, $222$, $;$]; and (6) [$show$, $ $, $cost$, $ $, $345$]
→[$what$, $ $, $is$, $ $, $the$, $ $, $cost$, $ $, $of$, $ $, $flight$, $ $, $345$].

As can be seen in (4), (5) and (6), a list, in the disclosed embodiment, is delimited by square brackets, and its members are separated by commas. Tokens, in the disclosed embodiment, consist of character strings delimited by dollar signs.

After tokenization, the input is preprocessed during step 26, so as to transform the input according to the synonyms stored in the system. A synonym is a pair of the form, X→Y, where X and Y are collections of tokens.

In the present invention, during preprocessing, the tokenized input is scanned and, whenever the left-member of a synonym is encountered, it is replaced by the right-member. For example, if the tokenized pair shown in (4) is stored as a synonym in the system, then the result of preprocessing:

[$what$, $ $, $is$, $ $, $the$, $ $, $arrival$, $ $, $time$, $ $, $of$, $ $, $flight$, $ $, $222$]
is the following:
[$what$, $ $, $is$, $ $, $the$, $ $, $arr$, $_$, $time$, $ $, $of$, $ $, $flight$, $ $, $222$].

The sequence "$arrival$, $ $, $time$" is transformed by preprocessing to "$arr$, $_$, $time$".

In scanning a tokenized input, two or more synonyms may be applicable at a given point. In this case, the system determines which synonym to apply. This determination is called "disambiguation of synonyms." The term "disambiguation" is standard in computational linguistics and will be familiar to one skilled in the art.

To disambiguate, a measure of length is computed for the left-member of each synonym. In the disclosed embodiment, the length of the left-member of a synonym is computed as the number of tokens making up the left-member. If two or more synonyms can be applied, the synonym whose left-member has the greatest length is preferred. With textual inputs, if the left-member of a synonym represents a contiguous sequence of tokens, this method will yield a unique solution. In other cases, it may be desired to apply additional criteria to achieve complete disambiguation.

Preprocessing can be recursive in the sense that when the right-member of a synonym is substituted for the left-member, the right-member may itself be subsequently transformed according to the synonyms stored in the system. Preprocessing can be multi-pass in the sense that the entire input, once preprocessed as described, is subjected to additional preprocessing until some criterion is satisfied.

Returning to FIG. 1, after input X is obtained during step 20, the input is tested at step 30, to see if it is an instruction to end. If X is an instruction to end, control is transferred to the "End" mechanism 32, which performs such items as saving information to disk.

If the X input is not an end instruction, then at step 40 the system determines whether to begin processing. In some applications, there will be inputs that, under appropriate conditions, cause control to be transferred to the processing stage 45 at this point. If X is such an input, control is transferred, as shown in FIG. 1. The mechanism for processing input X will depend on the application. Following processing, control is returned to step 20 and a new input is obtained.

If step 40, "begin processing," yields a negative result, control is transferred to step 50, where it is determined whether input X can be parsed. An input can be parsed if it can be subdivided into one or more statements, and each statement can be parsed. A statement can be parsed if it is an instance of one of the underlying formal languages, or if it is an instance of one of the rules stored in the system.

Figure 3:
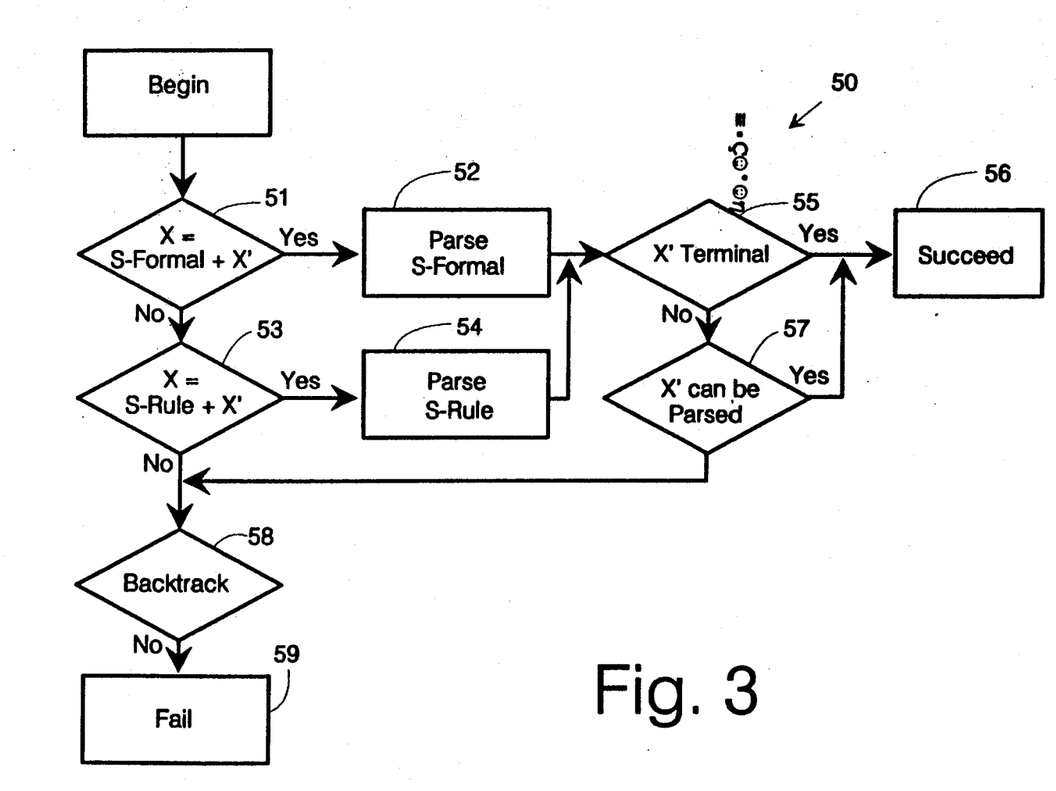
FIG. 3 is a flow diagram depicting the sequence of operations to parse an input.

FIG. 3 shows, in more detail, the sequence of steps which occur during step 50, to determine whether X can be parsed. During step 51, labeled "X=S-Formal+X'", it is determined whether X can be decomposed into a statement S-Formal, and other material X', where S-Formal is an instance of one of the underlying formal languages. Various methods, familiar to one skilled in the art, are available for making this determination.

If "X=S-Formal+X'" succeeds, control is transferred to step 52, labeled "Parse S-Formal." Parsing transforms S-Formal into a sequence of tokens and objects. An object is a pair comprising a referent and a datatype, and may include other material as well. The referent is a collection of tokens. A datatype is a category used in the underlying formal language of which S-Formal is an instance.

To illustrate the transformation of S-Formal into a list of tokens and objects, it may be helpful to refer to the tokenized SQL statement which is the right-member of (5):

(7) [$select$, $ $, $arr$, $_$, $time$, $ $, $from$, $ $, $flights$, $ $, $where$, $ $, $flight$, $ $, $=$, $ $, $222$, $;$].

In the disclosed embodiment, parsing this input would yield the following list of tokens and objects:

(8) [$select$, $ $, ([$arr$, $_$, $time$], column), $ $, $from$, $ $, ([$flights$], table), $ $, $where$, $ $, ([$flight$], column), $ $, $=$, $ $, ([$222$], number), $;$].

The four objects in the above list are ([$arr$, $_$, $time$], column); ([$flights$], table); ([$flight$], column); and ([$222$], number). A pair, in the disclosed embodiment, is delimited by parentheses, and its members are separated by a comma. The datatypes "column," "number," and "table" are used in the SQL database language. While objects are shown above as a referent followed by a datatype, the opposite order could serve equally well. Methods that can be used to transform a tokenized statement of a formal language into a list of tokens and objects will be familiar to one skilled in the art.

Steps 51 and 52 are shown as distinct in FIG. 3. This distinction is made so as to enhance the clarity of the discussion. In the disclosed embodiment, the decomposition of X into S-Formal and X', and the parsing of S-Formal, are carried out as a single process. This is also true in the disclosed embodiment regarding the steps 53 and 54.

Steps 51 and 52 are both nondeterministic. That is, there may be more than one decomposition of X into an S-Formal and an X', and given a particular decomposition of X into S-Formal and X', there may be more than one way that S-Formal can be parsed by the underlying formal language(s).

Multiple parses of S-Formal are possible if there is more than one way for S-Formal to be parsed by an underlying formal language. Multiple parses are also possible if there are two or more underlying formal languages, and S-Formal can be parsed by more than one of them.

The terms "nondeterminism" and "nondeterministic" are used in the sense familiar to one skilled in the art. It is possible to implement the present invention so that nondeterminism is eliminated from any of the nondeterministic mechanisms mentioned in the present description.

Following step 52, step 55, labeled "X' terminal," is executed. If X' is empty or constitutes material that indicates that parsing should terminate, then control is transferred to step 56, labeled "Succeed." If "X' terminal" yields a negative result, control is transferred to step 57, labeled "X' can be parsed." The mechanism of step 57 is the same as the overall mechanism 50 shown in FIG. 3, which means that the mechanism of FIG. 3 is formally recursive.

If step 57 yields a positive result, then control is transferred to step 56. Otherwise, control is transferred to step 58 labeled "Backtrack," which is described below.

If the step 51 test "X=S-Formal+X'" fails, then control is transferred to step 53, labeled "X=S-Rule+X'". At this step, a test is applied to determine whether X can be decomposed into S-Rule, and some other material X', where S-Rule is an instance of a rule.

Rules that could be generated by the disclosed embodiment from two of the examples provided earlier would be the following:

(9) [$what$, $ $, $is$, $ $, $the$, $ $, (1, column), $ $, $of$, $ $, $flight$, $ $, (2, number)]
→[[$select$, $ $, (1, column), $ $, $from$, $ $, $flights$, $ $, $where$, $ $, $flights$, $ $, $=$, $ $, (2, number), $;$]];

(10) [$show$, $ $, (1, column), $ $, (2, number)]→[[$what$, $ $, $is$, $ $, $the$, $ $, (1, column), $ $, $of$, $ $, $flight$, $ $, (2, number)]].

In these rules, the left-member is a list of tokens and slots; the right-member is a list of lists of tokens and slots.

A slot, in (9) and (10), is a pair consisting of an index and a datatype. More generally, a slot is a structure that indicates that material of a given datatype can occur at a given location. It contains an index, a datatype, and possibly other material as well. The index can be an integer, or a member of some enumerable set. The datatype is a category meaningful in one of the underlying formal languages. While slots are shown above as an index followed by a datatype, the opposite order could serve equally well.

The reason the right-member, in (9) and (10), is a list of lists, is that the right member of a rule can derive from a collection of statements. In the disclosed embodiment, each statement contributes a list of tokens and slots to the right-member.

The representation of rules illustrated and described above is not the only one that could be utilized with the present invention. In general, a rule is a pair whose left-member consists of a template, and whose right member is a collection of one or more templates. A template is a collection of tokens, slots, and possibly additional material. A rule can contain additional material. In the disclosed embodiment, for example, a rule also contains measures of its length and generality, as well as other information. The measures of length and generality are used in the disambiguation of rules, described below.

An instance of a rule is a collection of tokens that can be realized by substituting for each slot in the left-member of the rule a set of tokens conforming to the datatype of the slot. For example, the following constitutes an instance of the rule shown in (9):

(11) [$what$, $ $, $is$, $ $, $the$, $ $, $dep$, $_$, $time$, $ $, $of$, $ $, $flight$, $ $, $999$].

The tokens "$dep$, $_$, $time$" are the tokenized form of a syntactically correct expression for a column. The token "$999$" is the tokenized form of a syntactically correct expression for a number. If, in the rule in (9), the slot "(1, column)" is replaced by "$dep$, $_$, $time$" and the slot "(2, number)" is replaced by "$999$", then the left member of the rule becomes identical to the above list, from which it follows that the list is an instance of the rule. Methods for determining whether a collection of tokens constitutes an instance of a rule will be familiar to one skilled in the art.

If a statement is an instance of one of the rules stored in the system, then it is possible that it is an instance of other rules as well. Therefore, there should be a way to determine which rule to apply in parsing the statement. This determination is called "disambiguation of rules".

Disambiguation of rules, in the present invention, is accomplished by searching the rules stored in the system in the order described below. The first rule encountered that can be used to parse the expression under consideration is the rule that is used.

For each rule, measures of length, generality, and position are computed. The length of a rule is a measure of the size of the left-member of the rule. The generality of a rule is a measure of the size of the class of expressions that could be instances of the rule. The position of a rule reflects the placement of the rule according to some indexing scheme.

In the disclosed embodiment, length is computed as the sum of the number of printing tokens and the number of slots in the left-member of the rule. Generality is computed as the number of distinct slots in the left-member. Position corresponds to the position of the rule in a listing of rules that is viewable and modifiable by the user.

Rules are searched so that those of greater length precede those of lesser length. Given two or more rules of the same length, those of lesser generality precede those of greater generality. Given two or more rules of the same length and generality, those having a lower position precede those having a higher position.

If X can be decomposed into S-Rule and other material X', where S-Rule is an instance of a rule, then control is transferred to the step 54 labeled "Parse S-Rule" in FIG. 3. Parsing transforms S-Rule into a sequence of tokens and objects. For example,

[$what$, $ $, $is$, $ $, $the$, $ $, $arr$, $_$, $time$, $ $, $of$, $ $, $flight$, $ $, $222$]

would be transformed into the following, applying the rule in (9):

[$what$, $ $, $is$, $ $, $the$, $ $, ([$arr$, $_$, $time$], column), $ $, $of$, $ $, $flight$, $ $, ([$222$], number)].

Methods for transforming a tokenized input into a sequence of tokens and objects, using rules of the kind described herein, will be familiar to one skilled in the art.

Step 53 is nondeterministic, because there may be more than one way to decompose X into an S-Rule and an X'. Step 54, however, is deterministic. This is because the disambiguation of rules as described above allows only a single rule to be successfully applied to a given input. It is consistent with the present invention, however, to reformulate this step so as to make it nondeterministic by dropping or relaxing one or more of the criteria used in the disambiguation of rules. For example, if rules were not assigned a position as described above, then it would be possible to generate collections of rules with respect to which some inputs were ambiguous, with the result that "Parse S-Rule" would be capable of generating multiple solutions when presented with these inputs.

If the test of step 53, "X=S-Rule+X'", fails, then control is transferred to the step 58 labeled "Backtrack." Backtracking will succeed if a new solution can be generated at an earlier invocation of "X=S-Formal+X'," "Parse S-Formal," "X=S-Rule+X'," or "Parse S-Rule." The term "backtracking" is used in the sense familiar to one skilled in the art.

If backtracking is not possible, control is transferred to step 59, labeled "Fail." If "X=S-Rule+X'" succeeds then, as is shown in FIG. 3, control is eventually transferred to step 55, "X' terminal."

If, as a result of the steps in step 50, X can be parsed, then control is transferred to step 60, labeled "Translate X" in FIG. 1. Following this step, control is transferred to step 45, "Process X." Depending on the application, and in particular on the mechanism of "Process X," it may not be necessary to translate X prior to transferring control to step 45.

If control has been transferred to step 60, "Translate X," then from the logic of the steps followed to this point it is known that X is composed of one or more statements that can be parsed. If these statements consist entirely of instances of the underlying formal language(s), then there is no need for, or possibility of, translation. Otherwise, each statement that is an instance of a rule is translated by applying to the statement the rule of which it is an instance, in the manner now set forth.

To illustrate the translation of a statement, consider the following tokenized input:

[$show$, $ $, $dep$, $_$, $time$, $ $, $345$].

This is an instance of the rule in (10). The translation of this input, applying the rule in (10), would be the following:

[[$what$, $ $, $is$, $ $, $the$, $ $, $dep$, $_$, $time$, $ $, $of$, $ $, $flight$, $ $, $345$]]

When a tokenized statement is translated, each token in the left-member of the rule that is applied is matched by a similarly located token in the statement. Each slot in the left-member is matched by a similarly located set of tokens in the statement. The matching tokens must satisfy the datatype of the slot.

Each slot in the rule is replaced by the set of tokens that match it. The replacement applies to all instances of the slot in both the left-member and right-member of the rule.

Translation of the statement is completed when the statement is replaced by the right-member of the rule that is being applied, with the slots of the right-member replaced by sequences of tokens as just described.

Once a statement has been translated, the translation may turn out to contain one or more instances of rules stored in the system. In this case, translation can be applied recursively. For example, the translation shown above could itself be translated using the rule in (9). This would yield the following:

[[$select$, $ $, $dep$, $_$, $time$, $ $, $from$, $ $, $flights$, $ $, $where$, $ $, $flight$, $ $, $=$, $ $, $345$, $;$]].

When the translation step 60 is completed, control is transferred to "Process X" step 45.

If X cannot be parsed during step 50, then control is transferred to step 70, labeled "Obtain input Y." Step 70 is identical in its operation to step 20, as explained in FIG. 2. Similarly, step 80, "Y can be parsed," has the same sequence of steps as step 50, as explained in FIG. 3.

After input Y is obtained during step 70, control passes to step 80 labelled "Y can be parsed." If Y cannot be parsed in step 80, then control passes to step 90, labeled "Form synonym." At this stage, the pair, X→Y, can be stored as a synonym. Whether it is stored depends on details of the implementation. Storage may be immediate and automatic, or it may depend on a subsidiary dialogue with the user, or on other considerations.

It is consistent with the present invention for a synonym and/or its members to contain material in addition to that mentioned in the foregoing discussion. In the disclosed embodiment, for example, a synonym also contains a measure of the length of its left-member. As described earlier, this supports disambiguation of synonyms. Once synonym formation is completed, control is transferred to step 20, "Obtain input X."

Figures 4, 5:
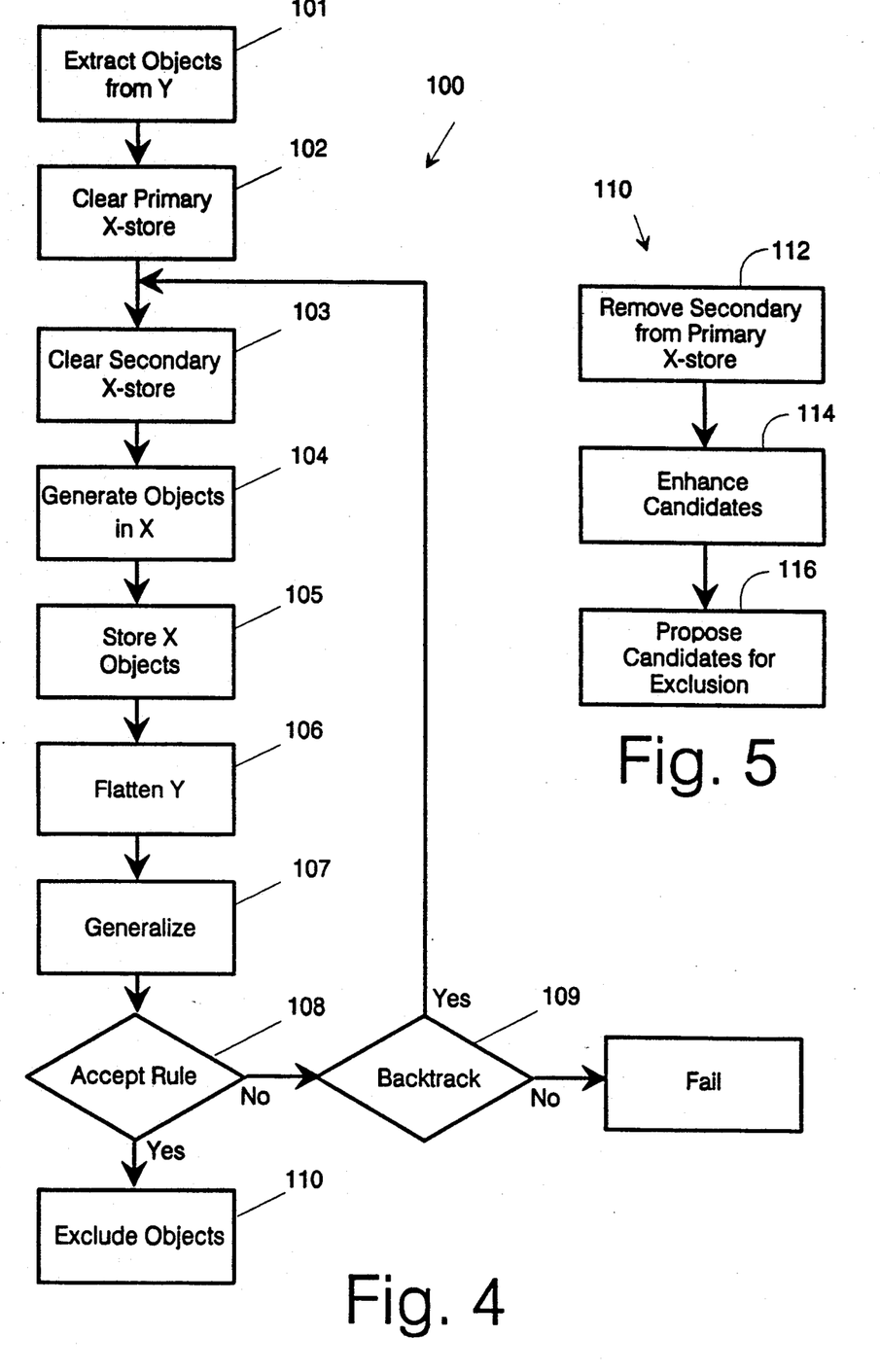
FIG. 4 is a flow diagram depicting the sequence of operations occurring during induction.
FIG. 5 is a flow diagram depicting the sequence of operations to exclude objects from induction.

If the test "Y can be parsed" in step 80 succeeds, then control is transferred to step 100, labeled "Induction." Induction step 100 is shown in expanded detail in FIG. 4. Induction can be illustrated by referring to the following pair derived from (2):

(12) [$what$, $ $, $is$, $ $, $the$, $ $, $arr$, $_$, $time$, $ $, $of$, $ $, $flight$, $ $, $222$]
→[[$select$, $ $, ([$arr$, $_$, $time$], column), $ $, $from$, $ $, ([$flights$], table), $ $, $where$, $ $, ([$flight$], column), $ $, $=$, $ $, ([$222$], number), $;$]].

The left-member of (12) is the left-member of (2) after being subjected, in accordance with the logic described in FIG. 1, to tokenization and preprocessing. In the course of preprocessing, the sequence "$arrival$, $ $, $time$" in (2) was replaced by "$arr$, $_$, $time$". The right-member of (12) is the right-member of (2) after being subjected, in accordance with the logic described in FIG. 1, to tokenization, preprocessing, and parsing. Consistent with the foregoing discussion, the left-member of a pair such as (12) will be referred to as X, the right-member as Y.

The first step in induction, step 101, is "Extract objects from Y." A list is extracted from Y comprising the objects contained therein. As will be described below, the system may have learned to exclude certain objects from induction. If this is the case, then no excluded objects are included in the list.

Assuming no excluded objects, the output of step 101, "Extract objects from Y," for (12), would be the following:

[([$arr$, $_$, $time$], column), ([$flights$], table), ([$flight$], column), ([$222$], number)].

The next two steps, 102 and 103, are "Clear primary X-store" and "Clear secondary X-store." As will be shown below, objects are generated in X by step 104, "Generate objects in X." Each time this occurs, the objects are stored in both a primary and secondary X-store. Steps 102 and 103 clear both of these stores.

Control is next transferred to step 104, "Generate objects in X." The mechanism of step 104 is as follows. Each object is selected in turn from the list of objects supplied by step 101, "Extract objects from Y." For a given object, X is scanned to see if there is a set of tokens in X that matches the referent of the object. If there is a match, the matching set in X is nondeterministically transformed into an object identical to the object under consideration.

If there is more than one match in X for the referent of a given object, it is implementation-dependent whether to allow more than one of these matches to be transformed into an object during an invocation of "Generate objects in X."

The next object is then selected and the process repeated, until all of the objects in the list are exhausted.

In (12) there is, in X, a match for the referents of "([$arr$, $_$, $time$], column)," "([$flight$], column)," and "([$222$], number)." Given the nondeterminism of "Generate objects in X," it can generate any of the following outputs:

(13) [$what$, $ $, $is$, $ $, $the$, $ $, ([$arr$, $_$, $time$], column), $ $, $of$, $ $, ([$flight$], column), $ $, ([$222$], number)];

(14) [$what$, $ $, $is$, $ $, $the$, $ $, ([$arr$, $_$, $time$], column), $ $, $of$, $ $, ([$flight$], column), $ $, $222$];

(15) [$what$, $ $, $is$, $ $, $the$, $ $, ([$arr$, $_$, $time$], column), $ $, $of$, $ $, $flight$, $ $, ([$222$], number)];

(16) [$what$, $ $, $is$, $ $, $the$, $ $, $arr$, $_$, $time$, $ $, $of$, $ $, ([$flight$], column), $ $, ([$222$], number)];

(17) [$what$, $ $, $is$, $ $, $the$, $ $, ([$arr$, $_$, $time$], column), $ $, $of$, $ 20$, $flight$, $ $, $222$];

(18) [$what$, $ $, $is$, $ $, $the$, $ $, $arr$, $_$, $time$, $ $, $of$, $ $, ([$flight$], column), $ $, $222$];

(19) [$what$, $ $, $is$, $ $, $the$, $ $, $arr$, $_$, $time$, $ $, $of$, $ $, $flight$, $ $, ([$222$], number)]; and (20) [$what$, $ $, $is$, $ $, $the$, $ $, $arr$, $_$, $time$, $ $, $of$, $ $, $flight$, $ $, $222$].

Observe that in the first output (13), three objects are present; in the next three outputs (14), (15), and (16), two objects are present; in the next three outputs (17), (18) and (19), one object is present; and in the last output (20), no objects are present.

There are criteria other than strict equality that could be applied to determine whether a match exists between a referent and a set of tokens. Considering text, it is possible to relax the requirement of strict equality and to allow that a referent and set of tokens match regardless of capitalization, e.g. [$Hello$]matches [$hello$]; or that a match occurs between terms that are semantically equivalent, as defined in some dictionary, e.g. [$Hello$]-matches [$How$, $ $, $are$, $ $, $you$]; or that a match occurs between terms that can be made identical by some spelling-correction algorithm, e.g. [$Hello$]matches [$Helo$]; and so forth.

The next step in FIG. 4, step 105, is "Store X objects." The objects generated in X by step 104, "Generate objects in X," are placed in both the primary and secondary X-store, so that they are available at stage 109, "Exclude objects." For example, if the output of step 104, "Generate objects in X," were the output in (13), then at step 105 the objects "([$arr$, $_$, $time$], column)", "([$flight$], column)" and "([$222$], number)" would be placed in the primary and secondary X-store.

The secondary X-store will always be empty at step 105, because it is cleared before each invocation of step 104. The primary X-store, on the other hand, may not be empty, as it is only cleared once, following step 101. If an object is in the primary X-store and is also one of the objects generated by the most recent invocation of step 104, "Generate objects in X," there is no need to store it twice.

Control is next transferred to step 106, "Flatten Y." An object is flattened if the tokens in the object's referent replace the object. It can be said that Y is flattened if each of the objects in Y is flattened that was not generated in X by the most recent invocation of step 104, "Generate objects in X."

Suppose, for example, that (15), above, was produced by the most recent invocation of step 104, "Generate objects in X." Then the following objects in Y were not generated in X:

([$flights$], table); ([$flight$], column).

Flattening Y would replace these objects by the tokens in their referents. The pair, X→Y, after the flattening of Y, would appear as follows:

(21) [$what$, $ $, $is$, $ $, $the$, $ $, ([$arr$, $_$, $time$], column), $ $, $of$, $ $, $flight$, $ $, ([$222$], number)]

→[$select$, $ $, ([$arr$, $_$, $time$], column), $ $, $from$, $ $, $flights$, $ $, $where$, $ $, $flight$, $ $, $=$, $ $, ([$222$], number), $;$].

At the end of step 106, "Flatten Y," X and Y contain the same objects.

Control is now transferred to step 107, "Generalize." Generalization, in the present invention, is based on the linguistic assumption that for a given X→Y, the equivalence in meaning between X and Y will be preserved if the referent of an object that occurs in both X and Y is replaced by another referent of the same datatype, for all occurrences of the object in X and Y.

Referring to the pair in (21), this assumption asserts that the relationship between X and Y would be preserved if both occurrences of "[$arr$,$_$, $time$]" were replaced by some other referent satisfying the column datatype and/or if both occurrences of "[$222$]" were replaced by some other referent satisfying the number datatype.

Given this assumption, it is reasonable to generalize from a given pair to a rule representing all pairs having the same structure. Generalization, in the present invention, is accomplished by changing objects into slots. To each object is associated an index, and the index replaces the referent of the object. As mentioned earlier, the index is a member of some enumerable set.

Using the pair in (21), the index 1 can be associated with "([$arr$, $_$, $time$], column)" and index 2 can be associated with "([$222$], number)". The result is the following:

[$what$, $ $, $is$, $ $, $the$, $ $, (1, column), $ $, $of$, $ $, $flight$, $ $, (2, number)]

→[[$select$, $ $, (1, column), $ $, $from$, $ $, $flights$, $ $, $where$, $ $, $flight$, $ $, $=$, $ $, (2, number), $;$]]

This is the rule that was exhibited earlier in (9).

Once a rule has been produced, control is transferred to step 108, "Accept rule." Acceptance could be provided or denied by a human user or there could be criteria in the system that allow it to provide or deny acceptance. If a rule is accepted then the rule is stored.

A rule would, in the normal course of events, be rejected if it has a slot where it shouldn't and/or fails to have a slot where it should, according to the judgment of the user or according to criteria applied by the system. Consider, for example, the following rule:

(22) [$what$, $ $, $is$, $ $, $the$, $ $, (1, column), $ $, $of$, $ $, (2, column), $ $, (3, number)]

→[[$select$, $ $, (1, column), $ $, $from$, $ $, $flights$, $ $, $where$, $ $, (2, column), $ $, $=$, $ $, (3, number), $;$]]

Given the pair in (12) as the input of induction, and given (13) as the output of step 104, "Generate objects in X", the rule in (22) would be the output of step 107, "Generalize". In this rule, the token "$flight$" has been replaced by the slot "(2, column)." In English, queries such as "what is the cost of flight 222" make sense, whereas queries such as "what is the cost of arrival time 222," or "what is the cost of cost 222," do not. In other words, it does not make sense to allow an arbitrary column expression to replace "flight" in the example under consideration. The rule exhibited above, therefore, would probably be rejected. For similar reasons, a rule derived from (14) would probably be rejected.

If a rule is rejected at step 108, then control is transferred, in FIG. 4, to step 109, "Backtrack." It was indicated above that step 104, "Generate objects in X," is nondeterministic. Through backtracking, multiple solutions can be generated by step 104, "Generate objects in X." Assuming that not all of the available solutions have been generated, step 109, "Backtrack" will succeed. Otherwise, it will fail, leading to the state "Fail".

If step 108, "Accept rule," succeeds, control is transferred to step 110, labeled "Exclude objects." The purpose of excluding objects from induction arises from the possibility of generating a rule that is unacceptable because it has a slot where it shouldn't, as described above. This situation can be avoided if the object from which the slot derived was among the excluded objects stored in the system.

In the example being pursued, the object "([$flight$], column)," had it been among the excluded objects, would not have been present in the output of step 101, "Extract objects from Y," and so would not have become involved in any subsequent steps. Rules with a slot corresponding to this object could not have been generated.

Excluding objects, and the mechanisms associated with it, is a refinement of induction. In other words, induction could be carried out as described herein with the steps "Clear primary X-store," "Clear secondary X-store," "Store X objects," and "Exclude objects" removed.

The steps involved in stage 110, "Exclude objects," are shown in more detail in FIG. 5. The first step, step 112, is "Remove secondary from primary X-store," where the objects in the secondary X-store are removed from the primary X-store. The primary X-store will contain the objects that were generated in X by all invocations of step 104, "Generate objects in X." The secondary X-store will contain only those objects that were generated in X by the most recent invocation; this is the invocation that led to the acceptance of a rule in the course of the present induction.

The objects in the secondary X-store correspond to slots in the rule that was accepted, while the objects in the primary X-store that are not also in the secondary X-store do not correspond to any slots in the rule that was accepted. It is these objects that are in the primary X-store but not in the secondary, that are returned by step 112. Because they do not correspond to slots in the rule that was accepted, backtracking must have been required to generate a solution of "Generate objects in X" not containing these objects. Because it promotes efficient use of the system to reduce backtracking during induction, these objects should be considered for exclusion from induction.

Control is next transferred to step 114, "Enhance candidates." There is a set of objects stored in the system that are candidates for exclusion from induction. To each candidate is associated a strength. For the purposes of illustration it is assumed that strength is an integer with minimum value 1. Each object returned by step 112, "Remove secondary from primary X-store," is considered in turn. If it is already a candidate, the strength of the candidate is incremented. If it is not a candidate, it is stored as a candidate, and given a strength of 1.

Control is next transferred to step 116, "Propose candidates for exclusion." There is a system parameter called the exclusion threshold. Each object whose strength exceeds the exclusion threshold is removed from the set of candidates; it can then be added to the set of objects excluded from induction. Whether a given supra-threshold object is in fact added to the set of excluded objects can be determined by a dialogue with the user, or through some other means. At the termination of the process, all of the candidates that remain have strengths at or below threshold.

Returning to FIG. 1, if "Induction" step 100 returns a positive result, then control is transferred to "Obtain input X" step 20. If "Induction" step 100 returns a negative result, then control is transferred to "Backtrack" step 120. Backtracking will succeed if step 80, "Y can be parsed," which is nondeterministic (as described above) can generate a new solution. In that case, "Induction" step 100 is reinvoked. If "Backtrack" step 120 yields a negative result, then control is transferred to "Obtain input X" step 20.

While the invention has been described with reference to a preferred embodiment, the description is for illustrative purposes only and is not to be construed as limiting the scope of the invention. Various modifications and changes may occur to those skilled in the art without departing from the true spirit and scope of the invention as defined in the appended claims.

What is claimed is:

1. A computer implemented method for deriving a rule from the combination of:
   a first formal language input, and
   a first arbitrary input which is indicative of said first formal language input,
said method comprising, in combination, the steps of:
   accepting and storing said first formal language input and said first arbitrary input;
   comparing said first formal language input and said first arbitrary input to identify a first data element common to said first formal language input and said first arbitrary input,; and
   generating said rule by substituting at least one data object for at least one occurrence of said first data element in said first formal language input.

2. The computer implemented method of claim 1 further including the step of tokenizing said first formal language input and said first arbitrary input into tokens.

3. The computer implemented method of claim 2 further including the steps of:
   applying synonyms by comparing said tokens of said first arbitrary input and said first formal language input with a set of synonyms wherein each synonym is comprised of first and second synonym members; and
   replacing said tokens that are similar to said first synonym member with said second synonym member.

4. The computer implemented method of claim 3 wherein, when plural synonyms in said set of synonyms include a first synonym member which is similar to a given one of said tokens, replacing said given one of said tokens with the second synonym member of that one of said plural synonyms having the longest first synonym member.

5. The computer implemented method of claim 3 wherein said step of replacing said tokens with said second synonym members is repeated by comparing additional tokens found in replacement synonym members with said first synonym members and replacing said additional tokens which are similar to said further synonym members with said second synonym members.

6. The computer implemented method of claim 3 wherein said method is recursively invoked.

7. The computer implemented method of claim 1 further including the step of parsing said first formal language input into statements.

8. The computer implemented method of claim 7 further including the step of parsing said statements into tokens and objects.

9. The computer implemented method of claim 7 or 8 wherein the step of parsing is performed nondeterministically.

10. The computer implemented method of claim 8 wherein said object includes at least a referent and a datatype.

11. The computer implemented method of claim 10 wherein said referent includes at least a collection of tokens.

12. The computer implemented method of claim 1 wherein said code data element is a slot.

13. The computer implemented method of claim 1 wherein said rule is generated nondeterministically.

14. The computer implemented method of claim 13 wherein said rule is nondeterministically generated through backtracking.

15. The computer implemented method of claim 13 wherein the nondeterminism of said generation of said rule is controllable.

16. The computer implemented method of claim 8 wherein generating said rule further includes the steps of:
   identifying portions of said first arbitrary input that match tokens in said objects of said first formal language input and nondeterministically transforming identified portions into said objects; and
   generating said rule by transforming said objects into slots.

17. The computer implemented method of claim 16 wherein selected objects are excluded from said method of rule generation.

18. The computer implemented method of claim 12 or 16 wherein said slot includes at least an index and a datatype.

19. The computer implemented method of claim 1 wherein said first formal language input is capable of description in at least one formal language or by stored rules, or in at least one formal language and by stored rules.

20. The computer implemented method of claim 1 wherein said first formal language input and said first arbitrary input include data formats from the group consisting of textual, graphical, acoustic, video, or multimedia.

21. The computer implemented method of claim 1 for deriving a computer command expressed as a formal language output from said rule and a second arbitrary input which is indicative of said formal language output and which also includes a second data element which also occurs in said formal language output, further including the steps of:
   accepting and storing said second arbitrary input; and
   generating said formal language output by substituting said second data element for at least one occurrence of said code data element in said first formal language input.

22. The computer implemented method of claim 1 wherein if said first formal language input cannot be parsed then a synonym is formed from said first arbitrary input and said first formal language input and said synonym is capable of being stored.

23. A computer implemented method for generating a rule having first and second members where said first member is indicative of said second member from the combination of:

a first formal language input, and a first arbitrary input which is indicative of said first formal language input, said method comprising, in combination, the steps of:
- accepting and storing said first formal language input and said first arbitrary input;
- comparing said first formal language input and said first arbitrary input to identify a first data element common to said first formal language input and said first arbitrary input,; and
- generating said first and second members by substituting a data object for at least one occurrence of said first data element in said first formal language input.

24. The computer implemented method of claim 23 wherein said first member is comprised of a first template and said second member is comprised of at least a second template.

25. The computer implemented method of claim 24 wherein said first and second templates are comprised of at least tokens and slots.

26. The computer implemented method of claim 23 wherein said first formal language input is capable of description in at least one formal language or by stored rules, or in at least one formal language and by stored rules.

27. The computer implemented method of claim 23 wherein said first formal language input and said first shorthand input include data formats from the group consisting of textual, graphical, acoustic, video, or multimedia.

28. The computer implemented method of claim 24 further including the step of tokenizing said first formal language input and said first arbitrary input into tokens.

29. The computer implemented method of claim 28 further including the steps of
- applying synonyms by comparing said tokens of said first arbitrary input and said first formal language input with a set of synonyms wherein each synonym is comprised of first and second synonym members; and
- replacing said tokens that are similar to said first synonym member with said second synonym member.

30. The computer implemented method of claim 29 wherein when more than one first synonym member is similar, then said tokens are replaced with the second synonym member of the longest first synonym member.

31. The computer implemented method of claim 29 wherein said method is recursively invoked.

32. The computer implemented method of claim 29 wherein said method is multipass.

33. The computer implemented method of claim 24 further including the step of parsing said first formal language input into statements.

34. The computer implemented method of claim 33 further including the step of parsing said statements into tokens and objects.

35. The computer implemented method of claim 33 or 34 wherein the step of parsing is performed nondeterministically.

36. The computer implemented method of claim 34 wherein said object includes at least a referent and a datatype.

37. The computer implemented method of claim 36 wherein said referent includes at least a collection of tokens.

38. The computer implemented method of claim 23 wherein said code data element is a slot.

39. The computer implemented method of claim 23 wherein said rule is generated nondeterministically.

40. The computer implemented method of claim 39 wherein said rule is nondeterministically generated through backtracking.

41. The computer implemented method of claim 39 wherein the nondeterminism of said generation is controllable.

42. The computer implemented method of claim 34 wherein generating said rule further includes the steps of:
- identifying portions of said first arbitrary input that match tokens in said objects of said first formal language input and nondeterministically transforming identified portions into said objects; and
- generating said rule by transforming said objects into slots.

43. The computer implemented method of claim 42 wherein selected objects are excluded from said method of rule generation.

44. The computer implemented method of claim 38 and 42 wherein said slot includes at least an index and a datatype.

45. The computer implemented method of claim 24 for deriving a computer command expressed as a formal language output from said rule and a second arbitrary input which is indicative of said formal language output and which also includes a second data element which also occurs in said formal language output, further including the steps of:
- accepting and storing said second shorthand input;
- generating said formal language output by substituting said second data element for at least one occurrence of said code data element in said at least a second template.

46. The computer implemented method of claim 24 wherein if said first formal language input cannot be parsed then a synonym is formed from said first arbitrary input and said first formal language input and said synonym is capable of being stored.

47. A computer implemented method for deriving a computer output having a first data element from the combination of:
- a set of rules where each rule includes first and second members and establishes a correspondence between said first member and said second member and where said second member includes at least one data object, and
- a first arbitrary input which is indicative of said computer output, said method comprising, in combination, the steps of:
- accepting and storing said first arbitrary input;
- generating said computer output by substituting said first data element for at least one occurrence of said data object in said second member of a selected one of said set of rules.

48. The computer implemented method of claim 47 wherein each of said first members is comprised of a distinct first template and each of said second members is comprised of at least a second template.

49. The computer implemented method of claim 47 or 48 wherein said selected rule is selected from said set of rules according to predetermined order.

50. The computer implemented method of claim 49 wherein said predetermined order includes evaluating measures of length, generality and position.

51. The computer implemented method of claim 50 wherein said measure of length includes counting tokens and slots of said first member, said measure of generality includes counting the number of slots of said first member, and said measure of position includes determining the placement of said rule according to a predetermined indexing scheme.

52. The computer implemented method of claim 47 wherein said selected rule is selected from said set of rules nondeterministically.

53. The computer implemented method of claim 47 or 48 wherein said method of generating said computer output includes means for recursively invoking said method to process said first shorthand input.

54. The computer implemented method of claim 47 or 48 wherein said method of generating said formal language output includes means for recursively invoking said method to process a compound one of said first arbitrary input.

55. The computer implemented method of claim 48 wherein said first template also includes at least one code data element which is indicative of the code data element in said at least said second template.

56. The computer implemented method of claim 55 wherein said code data elements are slots.

57. The computer implemented method of claim 56 further including the step of identifying said first data element by comparing said first template and said first arbitrary input to determine whether said first arbitrary input conforms to said first template.

58. The computer implemented method of claim 57 wherein said first shorthand input conforms to said first template when tokens of said first template match correspondingly located portions of said first shorthand input and slots of said first template match correspondingly located portions of said first arbitrary input.

59. The computer implemented method of claim 58 wherein said slots match said correspondingly located positions of said first arbitrary input if said matched portions of said first arbitrary input conforms to the datatypes of said slots.

60. The computer implemented method of claim 58 wherein when said first arbitrary input conforms to said first template said slots are replaced by material of said second shorthand input matching said slots.

* * * * *